F. DALE.
FRUIT HARVESTER.
APPLICATION FILED FEB. 7, 1921.
1,410,379.
Patented Mar. 21, 1922.
5 SHEETS—SHEET 1.
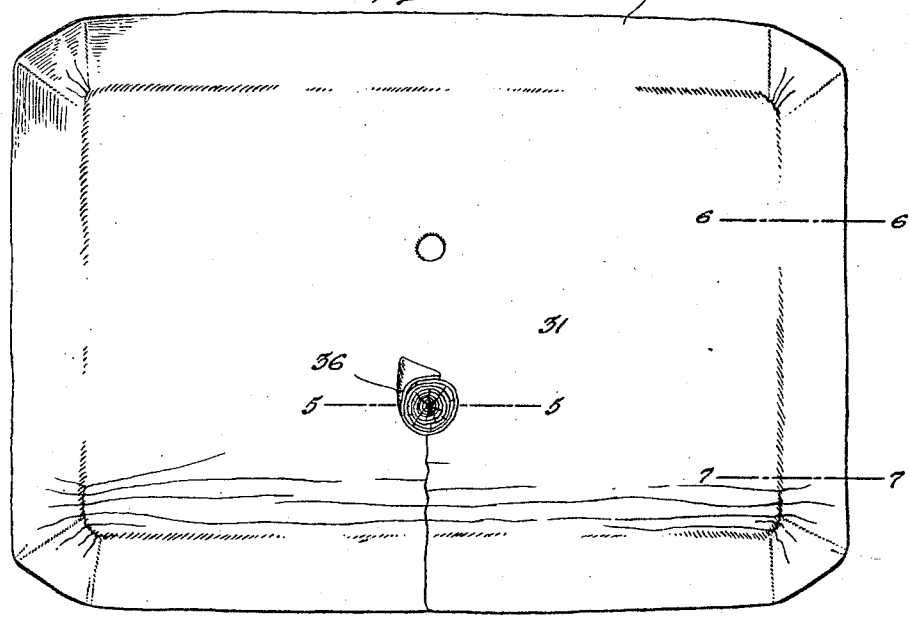
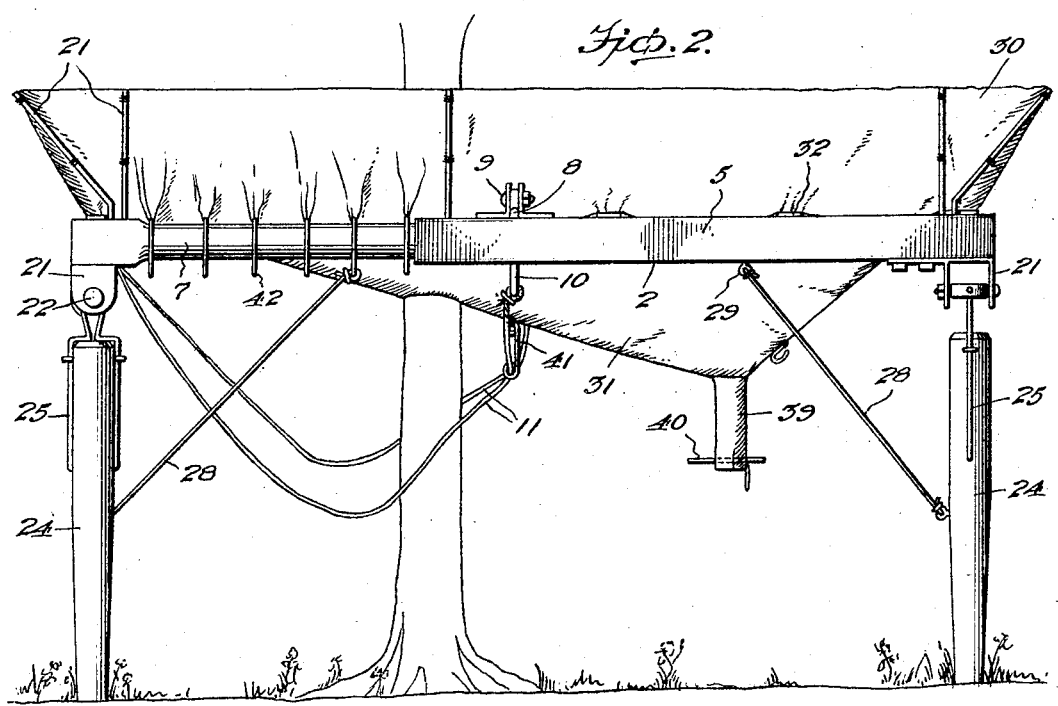

F. DALE.
FRUIT HARVESTER.
APPLICATION FILED FEB. 7, 1921.
1,410,379.
Patented Mar. 21, 1922.
5 SHEETS—SHEET 2.
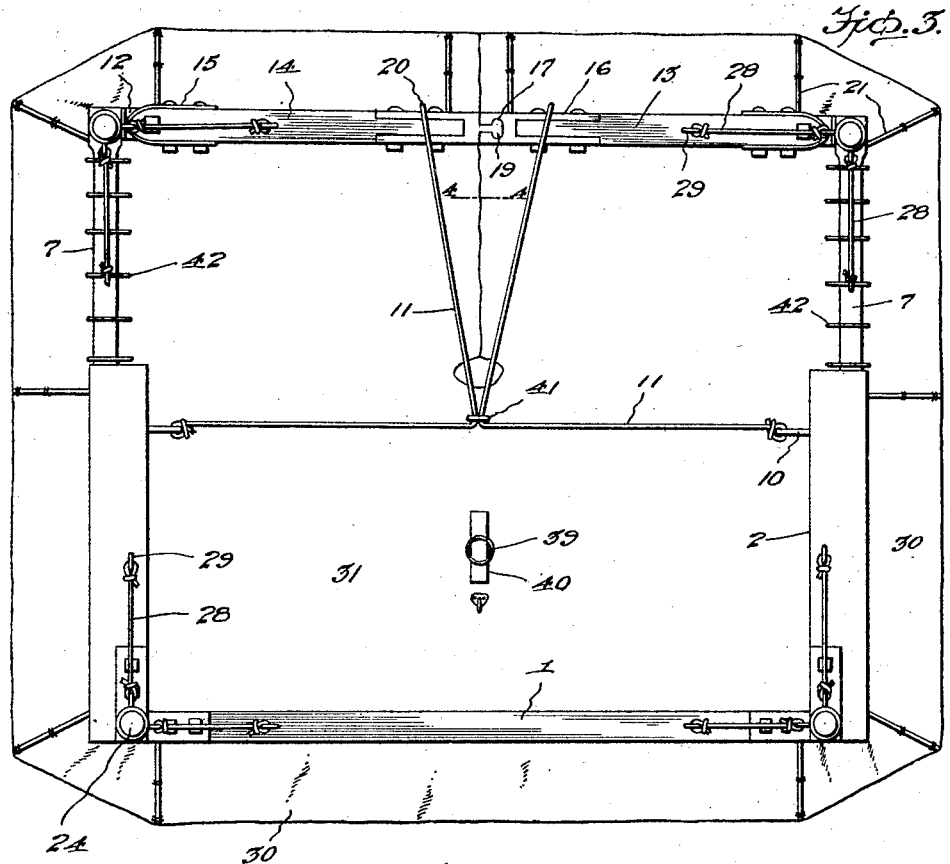
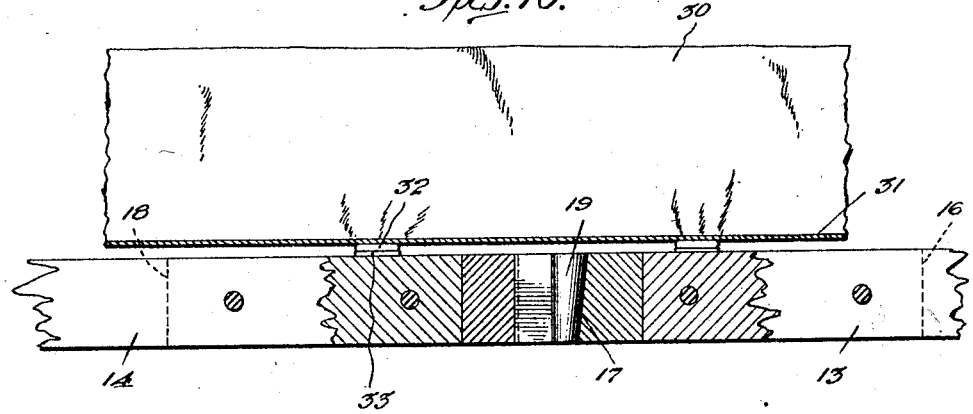
Frank Dale INVENTOR
BY Victor J. Evans
ATTORNEY
WITNESS:

F. DALE.
FRUIT HARVESTER.
APPLICATION FILED FEB. 7, 1921.
1,410,379.
Patented Mar. 21, 1922.
5 SHEETS—SHEET 4.
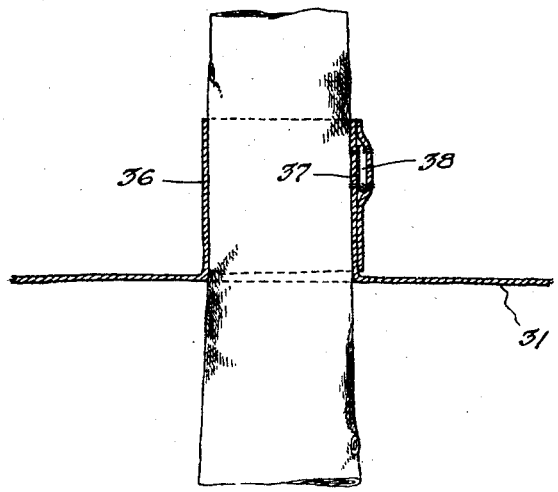
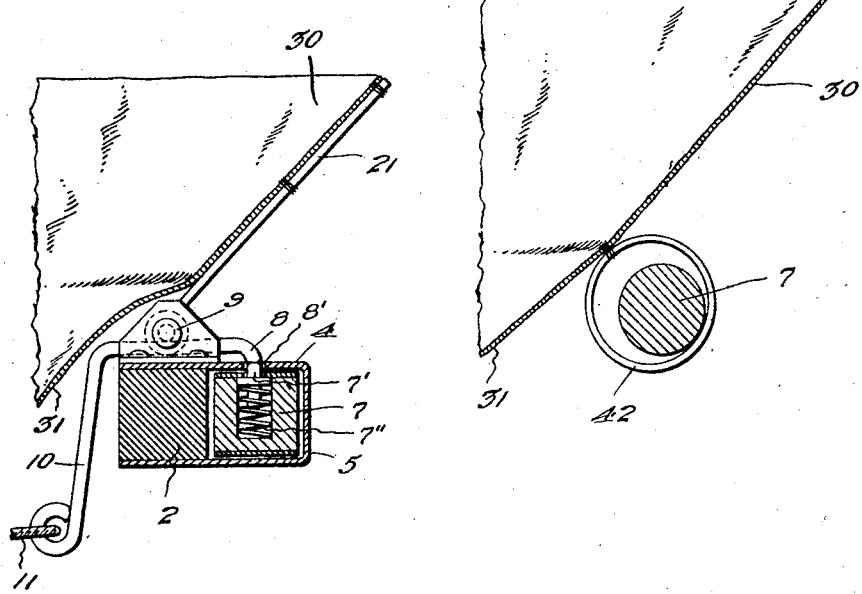
Frank Dale INVENTOR
BY Victor J. Evans
ATTORNEY
WITNESS:

F. DALE.
FRUIT HARVESTER.
APPLICATION FILED FEB. 7, 1921.

1,410,379.

Patented Mar. 21, 1922.
5 SHEETS—SHEET 5.

Frank Dale INVENTOR
BY Victor J. Evans
ATTORNEY

WITNESS:

UNITED STATES PATENT OFFICE.

FRANK DALE, OF OILFIELDS, CALIFORNIA.

FRUIT HARVESTER.

1,410,379.  Specification of Letters Patent.  Patented Mar. 21, 1922.

Application filed February 7, 1921. Serial No. 443,092.

*To all whom it may concern:*

Be it known that I, FRANK DALE, a citizen of the United States, residing at Oilfields, in the county of Fresno and State of California, have invented new and useful Improvements in Fruit Harvesters, of which the following is a specification.

My present invention has reference to a fruit or nut harvester.

My object is to secure around a tree, from which the nuts or fruit is to be gathered, a canvas or similar fabric body which is bellied from the ends to the center thereof, and which is suitably supported in approximately a horizontal position, regardless of the uneven ground surfaces on which the same is arranged, said body having a depending valved spout through which the fruit or nuts pass when the same have been shaken or otherwise removed from the tree on to the body, suitable boxes being arranged beneath the funnel to receive the fruit or nuts, and the valve operated in accordance with the filling of the boxes.

A further object is the arrangement of a fabric funnel provided with a depending valved outlet spout, a frame of a novel construction, and both the funnel and the frame being adjustable and of a nature whereby the device may be arranged around varying sizes of trees from which the fruits or nuts are to be harvested, novel means being provided for supporting the frame, and novel means being also provided for retaining the corners of the funnel at a forward inclination so that the liability of the fruit or nuts dropping off of the corners will be thus prevented.

It is a still further object of the invention to produce a nut or fruit harvester which includes a frame having its end members constructed of telescopic sections, and one of its side members constructed of two pivoted sections provided with means whereby the same may be quickly and effectively secured in longitudinal alignment, the frame supporting thereon a fabric funnel which is of a size and construction to permit of the same being adjustable when the frame is adjusted, and which is provided with means whereby the same may be arranged to entirely surround the base of the tree, the said funnel having a depending fabric spout, which is valved so as to regulate the outflow of the fruit or nuts therethrough, and the frame being supported on legs which are swiveled thereto in a novel manner whereby the frame and funnel may be supported substantially horizontal regardless of the irregularities of the ground surface on which it is arranged.

A further object is the production of a fruit or nut harvester including a frame that supports thereon a fabric funnel provided with a valved outlet spout, said frame having means engaging with the edges of the funnel for sustaining the same at an upward angle with respect to the frame, the end members of the frame being constructed of telescopic sections which are latched, one of the former comprising two hinged members, having means at the confronting ends thereof for locking the same in longitudinal alignment and also having means for releasing the latches, when the side members are swung away from each other to permit of the adjustment of the telescopic end members without necessitating the operator actually engaging the latches.

It is a still further object of the invention to produce a nut or fruit harvester including an adjustable frame having swiveled supporting legs, a fruit or nut receiving funnel being removably attached to the frame and adjustable with the frame, said funnel being slotted at one of its sides to permit of the same being arranged around the base of the tree to be harvested, connecting means being provided between the edges of the said slit portions of the funnel, a collar being also arranged at the terminal of the slit designed to surround and be adjustably connected to the base of the tree, while the said funnel is also provided with a depending spout at the deepest portion of the funnel, and a valve controls the outlet of the spout.

The foregoing, and other objects which will appear as the nature of the invention is better understood, may be accomplished by a construction, combination and operative arrangement of parts, such as is disclosed by the drawings which accompany and form part of this specification.

In the drawings:—

Figure 1 is a view showing the arrangement of my improved harvester around a tree.

Figure 2 is an enlarged end elevation of the improvement.

Figure 3 is a bottom plan view thereof.

Figure 5 is a sectional view approximately on the line 5—5 of Figure 1.

Figure 6 is a sectional view approximately on the line 6—6 of Figure 1.

Figure 7 is a sectional view approximately on the line 7—7 of Figure 1.

Figure 10 is a view showing the manner in which the sectional sides are connected and held in longitudinal alignment.

Figure 8:
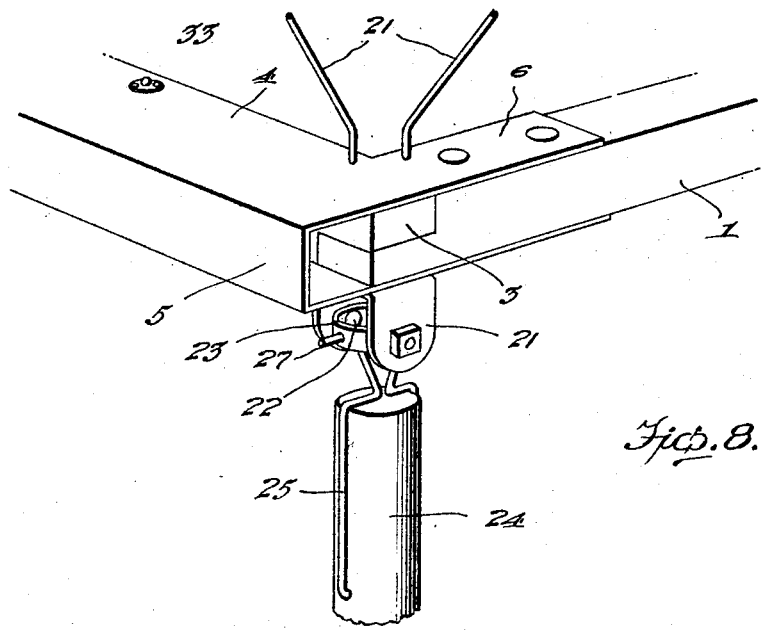
Figure 8 is a perspective view illustrating the manner in which the legs are connected to the frame.
Figure 9:
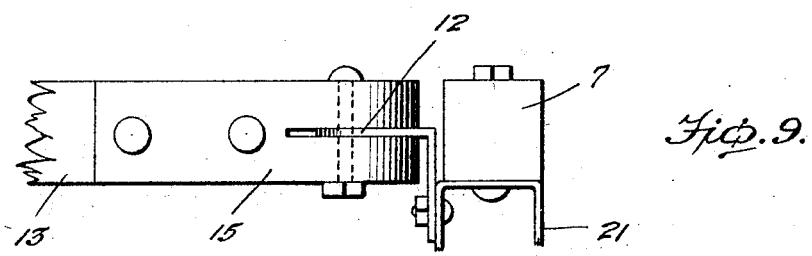
Figure 9 is a view illustrating the manner in which one of the hinged sides is connected to one of the telescopic end members of the frame.
Figure 4:
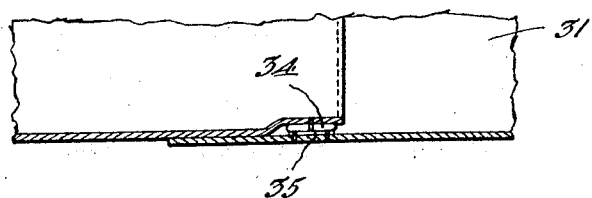
Figure 4 is a sectional view approximately on the line 4—4 of Figure 3.
Figure 11:
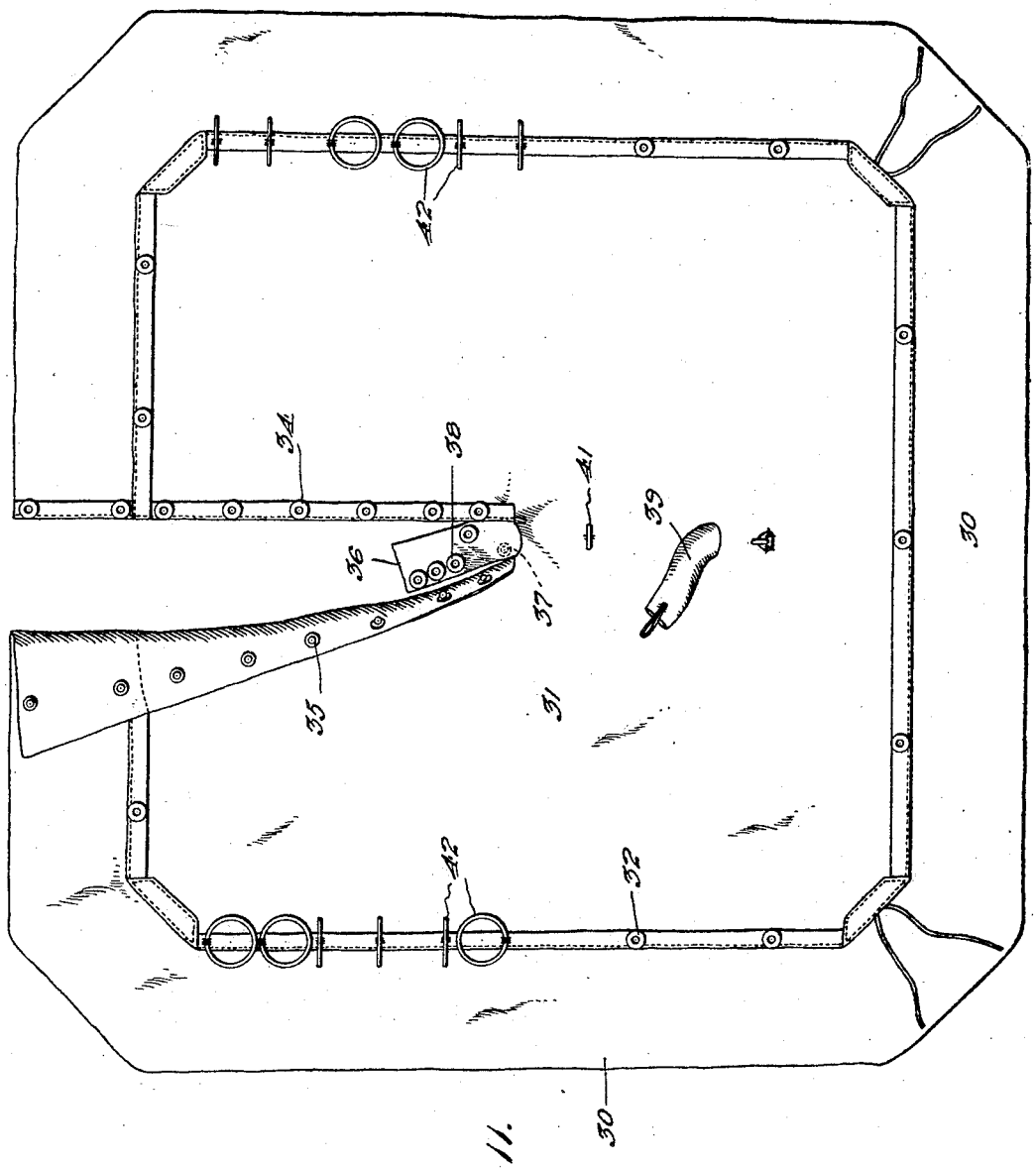
Figure 11 is a bottom view of the funnel detached.

It will be noted, as the description progresses, that the improvement, when not in use, may be folded to provide a small package which may be readily carried from tree to tree, the construction, it is to be stated being of light material. The funnel may be readily removed from the frame, and while not so illustrated in the drawings, both of the side members of the frame may be hingedly connected to the telescopic ends thereof, and also, as a matter of fact, the fixed side member may be removably attached to the ends.

The frame is preferably made up of light and strong wood which may be reinforced by metallic plates that are secured thereto, at points where the frame is most liable to breakage. As one of the side members of the frame is, in the drawings, shown fixed to the end members, this side member is indicated by the numeral 1, and will be referred to as the fixed side. The inner sections of the ends are indicated by the numeral 2. The wood portion of these ends, indicated by the numeral 3 abut with the inner face of the fixed side 1, and may be nailed or otherwise secured thereto if desired. However, these wooden members 3 have secured to the opposite faces thereof the parallel plates 4 of a substantially U-shaped metallic housing 5, the said housing projecting outward from each of the members 3, and the plates 4, at the ends thereof, which are arranged over the ends of the fixed side 1, are formed with extensions 6 which are bolted or otherwise secured to the said fixed side member. The housings 5 provide pockets for the outer and movable sections 7 of the ends 2. The movable sections 7 are preferably in the nature of cross sectionally rounded rods that may, if desired, be notched. These sections are, however, squared at the portions thereof received in the metallic housings 5. These portions of the sections 7 have projecting through the upper faces thereof catch members 7′ each of which being influenced by a spring 7″. Pivoted, as at 9, between suitable brackets on the upper faces of the sections 2 are wire members in the nature of triggers or dogs. The members are bent to provide offset ends 8 which are disposed directly over the projecting ends of the catch members 7′. Each dog has its inner end offset to provide what may be termed a handle 10, and to each of the handles there is connected a flexible element 11, for a purpose which will presently be described.

The outer ends of the movable sections 7 are preferably squared or rectangular in cross section and have hingedly connected thereto, as at 12, the sections 13 and 14 respectively of the movable side of the frame. The sections 13 and 14 are in the nature of rod members, but have their ends reinforced by metallic plates, and to one of these plates, 15, the hinge 12 is connected. The plate 16 on the free end of the section 13 has a key hole slot 17 therethrough, and the plate 18 on the free end of the section 14 has a substantially T-shaped extension 19 that is designed to be received in the key hole slot 17 whereby the sections 13 and 14 are held secured in longitudinal alignment. To the sections 13 and 14 the respective flexible elements 11 are connected, as indicated by the numeral 20. It will be apparent that when the sections 13 and 14 are swung outwardly on the sections of the telescopic sides of the frame, the flexible elements 11 will be drawn taut, so that the dogs 8 will be swung on their pivots 9 to cause the ends 8 thereof to depress the latches 7′ against the influence of their springs 7″, bringing the said latches below the openings 8′ in the housing 4, and thus permitting the members 7 to be moved outwardly on the fixed end sections 2.

On the outer ends of the section 7, and adjacent the corners of the fixed side 1, are depending substantially U-shaped brackets 21. Between the arms of each of the brackets there is pivoted, as at 22, a ring member 23. The ring, at points arranged right angularly of its pivots has openings therethrough.

The legs are indicated by the numeral 24. Each of the legs has secured to its sides upwardly extending metallic rods 25. These rods, at the upper ends of the legs are bent inwardly and from thence extended upwardly and the last mentioned portions are bent outwardly to provide fingers 27. The fingers 27 are oppositely directed, and are designed to be passed through the openings in the rings of the respective brackets. In this manner, the legs are swiveled on the frame. Between each of the legs and the members constituting the frame there are angularly arranged guy ropes 28 secured in eyes 29 on the side members of the frame. Each leg is provided with two guy ropes 28 which are arranged at right angles with respect to each other. Any two of the diagonally opposed legs will be sufficient to maintain an approximately horizontal position of the device, with the assistance of the opposing two legs which latter act only as partial sustaining members. Where the uneven ground is such that the guys cannot be used, or where two legs are acting as natural supports and are not diagonally opposed, then a third leg is swung until a desired tightness is obtained in the guys, when the third leg is stuck in the ground. Thus any two diagonally opposing legs, with their four guys or any two legs that are not diagonally opposed may be brought to proper supporting position by the adjustment of a single leg, which, of course, draws taut its guys, and as a consequence draws taut the guys of the other legs.

At the top of the frame, on the corners thereof are upstanding angularly disposed rods 21, arranged in pairs. One pair of these rods, or if desired, only a single rod is also arranged at the end of the fixed sections of the side members. These rods are trained through eyes preferably formed by stitches on the flanged edge 30 of the fabric funnel 31. The funnel has its edges, at its juncture with its flanges provided, on its under face with eyes 32 that are designed to receive expansible studs 33 on the upper face of the frame. Thus the funnel is removably connected to the frame, and the side flanges of the said funnel will direct the fruit or nuts to the center thereof which, of course, is bellied downwardly and which is provided with the outlet spout.

The edge of the funnel arranged over the hinged sides of the frame is slitted toward the center thereof, and one of the edges thus provided has secured on its under face eyelets 34 which are designed to receive compressible eyes 35 provided on the other edge which is overlapped by the first mentioned edge. At the terminal of the slit portions there is secured a fabric collar 36, that has its inner and fixed end provided with a compressible stud 37 designed to be engaged by one of spaced eyes 38 on the inner face of the collar. The collar is designed to be arranged around and secured on the trunk of the tree.

The funnel has an outlet opening therein surrounded by a depending preferably fabric spout 39, and the numeral 40 designates a valve for regulating the outlet of the spout.

The flexible latch operating elements, connected to the hinged sections of the side of the frame, passing through the guide 41 secured upon the under face of the fabric funnel to insure the proper operation of the latches when the said side sections are shrunk, and the flexible elements may also provide reinforcing means for the bottom of the funnel.

The funnel has its ends connected to the movable end members of the frame, through the medium of rings 42 which are arranged around the said frame sections and which are stitched or otherwise secured to the funnel.

It is believed that the foregoing description, when taken in connection with the drawings will clearly set forth the construction, operation and advantages of the improvement without further detailed description, but it is thought necessary to state that the description and drawings refer only to a satisfactory embodiment of the improvement, and that I may make all such changes as fall within the scope of what is claimed.

What I claim is:—

1. In a fruit or nut harvester, a fabric funnel slitted to receive a tree, means connecting the slit edges of the funnel, said funnel having a flanged edge, a collapsible frame including telescopic members supporting the funnel, means on said frame engaging the flange of the funnel for sustaining the same upright, swiveled legs supporting the frame, and means between said legs and frame for arranging the former angularly with respect to the latter for holding the frame substantially horizontally.

2. In a nut or fruit harvester, a fabric funnel slitted to receive a tree, means for connecting the slit edges thereof, said funnel having flanged edges, an outlet opening, a depending spout surrounding the opening, a valve controlling the outlet spout, a frame supporting the funnel including a fixed side and fixed end member, telescopic sections slidable in the end members, means for latching said sections in said members, a sectional side hingedly supported on the respective telescopic sections, interengaging means at the confronting ends of the side sections, and means connected to the side sections and to the latches for releasing said latches when the side sections are swung away from each other.

3. In a nut or fruit harvester, a fabric funnel having flanged edges slitted to receive a tree, latching means connecting the slit portions of the funnel, said funnel having an outlet spout, a valve therefor, a collapsible and telescopic frame supporting the funnel, means between the frame and the funnel detachably connecting the funnel to the frame, upstanding elements on the frame engaging the flange of the funnel, the sides of the frame comprising telescopic members, rings secured to the funnel and arranged over the telescopic members, means adjustably securing the telescopic members, hinged side sections connected to the outer telescopic sections, interlocking means at the confronting ends of the said sections, and means between said sections and the securing means of the telescopic section for releasing said means when the sections are swung away from each other, swiveled legs supporting the funnel, and means between the legs and frame for arranging the latter angularly with respect to the former, and for arranging the frame substantially horizontally.

In testimony whereof I affix my signature.

FRANK DALE.